(12) United States Patent
Tringali et al.

(10) Patent No.: US 10,357,919 B2
(45) Date of Patent: *Jul. 23, 2019

(54) METHOD AND APPARATUS FOR PHOTO-CURING WITH SELF-LUBRICATING SUBSTRATUM FOR THE FORMATION OF THREE-DIMENSIONAL OBJECTS

(71) Applicant: NEXA3D INC., Ventura, CA (US)

(72) Inventors: Luciano Tringali, Rome (IT); Andrea Denaro, Rome (IT); Gianni Zitelli, Ciampino (IT)

(73) Assignee: NEXA3D INC., Ventura, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/758,272

(22) PCT Filed: Oct. 3, 2016

(86) PCT No.: PCT/IT2016/000225
§ 371 (c)(1),
(2) Date: Mar. 7, 2018

(87) PCT Pub. No.: WO2017/056124
PCT Pub. Date: Apr. 6, 2017

(65) Prior Publication Data
US 2018/0250874 A1    Sep. 6, 2018

(30) Foreign Application Priority Data
Oct. 2, 2015    (IT) ........................ 102015000057527

(51) Int. Cl.
*B29C 33/58*    (2006.01)
*B29C 33/60*    (2006.01)
(Continued)

(52) U.S. Cl.
CPC ........ *B29C 64/124* (2017.08); *B29C 37/0067* (2013.01); *B29C 37/0075* (2013.01);
(Continued)

(58) Field of Classification Search
CPC ......... B29C 33/58; B29C 33/60; B29C 33/62; B29C 33/64; B29C 33/68; B29C 37/0067;
(Continued)

(56) References Cited

U.S. PATENT DOCUMENTS 4,575,330 A    3/1986    Hull
5,122,441 A    6/1992    Lawton et al.
(Continued)

FOREIGN PATENT DOCUMENTS

EP    0171069 A2    2/1986
EP    0484086 A1    5/1992
(Continued)

OTHER PUBLICATIONS

International Search Report and Written Opinion dated May 4, 2018, from the ISA: European Patent Office, for International Patent Application No. PCT/US2018/015285 (filed Jan. 25, 2018), 13 pgs.
(Continued)

*Primary Examiner* — Leo B Tentoni
(74) *Attorney, Agent, or Firm* — Ascenda Law Group, PC (57) ABSTRACT

Three-dimensional objects are formed by exposing a photo-curing liquid polymer to a radiation. The three-dimensional objects form by growth, due to the progressive curing of the photo-curing liquid polymer, in a space between a sheet transparent to the radiation and a supporting plate, that is, a portion already formed of the objects. During the growth process, the supporting plate progressively moves away from the transparent sheet. On the side of said transparent sheet facing towards the photo-curing liquid polymer, a membrane is arranged. The membrane is transparent to the
(Continued)

radiation, and is covered by a layer of liquid lubricant that is released gradually by the membrane.

15 Claims, 6 Drawing Sheets

(51) Int. Cl.

| | | |
|---|---|---|
| B29C 33/62 | (2006.01) | |
| B29C 33/64 | (2006.01) | |
| B29C 33/68 | (2006.01) | |
| B29C 64/124 | (2017.01) | |
| B29C 37/00 | (2006.01) | |
| B33Y 10/00 | (2015.01) | |
| B33Y 30/00 | (2015.01) | |
| B29C 64/135 | (2017.01) | |
| B29C 64/40 | (2017.01) | |
| B29C 64/277 | (2017.01) | |
| G02F 1/1335 | (2006.01) | |
| B29C 64/223 | (2017.01) | |
| B29C 64/255 | (2017.01) | |
| B29K 105/00 | (2006.01) | |

(52) U.S. Cl.
CPC .......... *B29C 64/135* (2017.08); *B29C 64/223* (2017.08); *B29C 64/255* (2017.08); *B29C 64/277* (2017.08); *B29C 64/40* (2017.08); *B33Y 10/00* (2014.12); *B33Y 30/00* (2014.12); *G02F 1/133514* (2013.01); *G02F 1/133603* (2013.01); *G02F 1/133606* (2013.01); *G02F 1/133617* (2013.01); *B29K 2105/0058* (2013.01); *G02F 2001/133607* (2013.01)

(58) Field of Classification Search
CPC ... B29C 37/0075; B29C 64/124; B29C 64/64; B29C 64/129; B29C 64/135; B29C 64/255; B29C 64/264; B29C 64/268; B29C 64/273; B29C 64/277; B29C 64/282; B29C 64/291; B29C 64/30
USPC ...... 264/313, 316, 337, 338, 401; 425/174.4
See application file for complete search history.

(56) References Cited

U.S. PATENT DOCUMENTS

| | | | |
|---|---|---|---|
| 5,391,072 | A | 2/1995 | Lawton et al. |
| 5,476,749 | A | 12/1995 | Steinmann et al. |
| 8,663,539 | B1 | 3/2014 | Kolodziejska et al. |
| D734,788 | S | 7/2015 | Reches et al. |
| D777,251 | S | 1/2017 | Stand |
| 2009/0002669 | A1 | 1/2009 | Liu et al. |
| 2012/0195994 | A1† | 8/2012 | El-Siblani et al. |
| 2014/0191442 | A1† | 7/2014 | Elsey |
| 2015/0027853 | A1† | 1/2015 | Findley et al. |
| 2015/0064298 | A1† | 3/2015 | Syao |
| 2015/0072293 | A1 | 3/2015 | Desimone |
| 2015/0145171 | A1 | 5/2015 | Walker et al. |
| 2015/0152270 | A1† | 6/2015 | Aizenberg et al. |
| 2015/0352788 | A1 | 12/2015 | Livingston et al. |
| 2016/0046072 | A1 | 2/2016 | Rolland et al. |
| 2016/0046075 | A1 | 2/2016 | Desimone et al. |
| 2016/0046080 | A1 | 2/2016 | Thomas et al. |
| 2016/0052205 | A1 | 2/2016 | Frantzdale |
| 2016/0082655 | A1 | 3/2016 | Castanon et al. |
| 2016/0129645 | A1 | 5/2016 | Wighton et al. |
| 2016/0136890 | A1 | 5/2016 | Castanon et al. |
| 2016/0193786 | A1 | 7/2016 | Moore et al. |
| 2016/0200052 | A1 | 7/2016 | Moore et al. |
| 2016/0229123 | A1 | 8/2016 | Carlson et al. |
| 2016/0263837 | A1 | 9/2016 | Goldman et al. |
| 2016/0288376 | A1* | 10/2016 | Sun ................... B29C 37/0075 |
| 2016/0303793 | A1 | 10/2016 | Ermoshkin et al. |
| 2016/0311158 | A1 | 10/2016 | Desimone et al. |
| 2016/0325493 | A1 | 11/2016 | Desimone et al. |
| 2016/0332386 | A1 | 11/2016 | Kuijpers |
| 2016/0369096 | A1 | 12/2016 | Rolland et al. |
| 2017/0129167 | A1 | 5/2017 | Castanon |
| 2017/0129175 | A1 | 5/2017 | Zitelli et al. |
| 2018/0036941 | A1 | 2/2018 | Xu et al. |

FOREIGN PATENT DOCUMENTS

| | | | |
|---|---|---|---|
| EP | 0506616 | A1 | 9/1992 |
| EP | 2226683 | A1 | 9/2010 |
| ES | 2588485 | T3 | 11/2016 |
| HK | 1215475 | A1 | 8/2016 |
| WO | 2012021940 | A1 | 2/2012 |
| WO | 2015107066 | A1 | 7/2015 |
| WO | 2016010946 | A1 | 1/2016 |
| WO | 2016081410 | A1 | 5/2016 |
| WO | 2016109550 | A1 | 7/2016 |
| WO | 2016123499 | A1 | 8/2016 |
| WO | 2016123506 | A1 | 8/2016 |
| WO | 2016126796 | A2 | 8/2016 |
| WO | 2016133759 | A1 | 8/2016 |
| WO | 2016140886 | A1 | 9/2016 |
| WO | 2016140888 | A1 | 9/2016 |
| WO | 2016140891 | A1 | 9/2016 |
| WO | 2016145050 | A1 | 9/2016 |
| WO | 2016145182 | A1 | 9/2016 |
| WO | 2016149097 | A1 | 9/2016 |
| WO | 2016149104 | A1 | 9/2016 |
| WO | 2016149151 | A1 | 9/2016 |
| WO | 2016126796 | A3 | 10/2016 |
| WO | 2016172784 | A1 | 11/2016 |
| WO | 2016172788 | A1 | 11/2016 |
| WO | 2016172804 | A1 | 11/2016 |
| WO | 2016172805 | A1 | 11/2016 |
| WO | 2017056124 | A1 | 4/2017 |

OTHER PUBLICATIONS

International Search Report and Written Opinion dated Feb. 6, 2017, from the ISA/European Patent Office, for International Patent Application No. PCT/IT2016/000225 (filed Oct. 3, 2016), 7 pages.
Henry, Dr. William, "MicroLED Arrays Find Applications in the Very Small", Photonics Spectra (Mar. 2013), downloaded from: https://www.photonics.com/a53224/MicroLED_Arrays_Find_Applications_in_the_Very, 7 pages.
International Search Report and Written Opinion dated May 24, 2018, from ISA—European Patent Office, for International Application No. PCT/US2018/012774 (filed Jan. 8, 2018), 13 pages.
Vu; et al., "LED Uniform Illumination Using Double Linear Fresnel Lenses for Energy Saying", Energies (2017), 10(2091):1-15.
Non-Final Office Action dated Feb. 21, 2019, for U.S. Appl. No. 15/415,688, filed Jan. 25, 2017, 12 pages.

\* cited by examiner
† cited by third party

METHOD AND APPARATUS FOR PHOTO-CURING WITH SELF-LUBRICATING SUBSTRATUM FOR THE FORMATION OF THREE-DIMENSIONAL OBJECTS

RELATED APPLICATIONS

This is a National Stage Application under 35 U.S.C. § 371 of International Application No. PCT/IT2016/000225, filed Oct. 3, 2016, which claims priority to IT102015000057527, filed Oct. 2, 2015.

FIELD OF THE INVENTION

This invention relates to a method and apparatus for photo-curing with self-lubricating substratum for the formation of three-dimensional objects.

More specifically, the invention relates to an innovative method for the production of three-dimensional objects, using a process for the photo-curing of photo-sensitive materials, suitably doped, which allows three-dimensional objects to be made according to a sequential and partially continuous formation process, considerably increasing the speed, the precision and the mechanical qualities of the final product, compared with what may be obtained using the methods of the tilting type.

The invention relates to the field of three-dimensional printing, commonly referred to as 3D printing, and in particular to the technology of 3D printing by means of photo-curing.

BACKGROUND

It is known that the field of 3D printing technology by photo-curing can comprise two basic technologies: stereolithographic printing, in which a laser emitting around 400 nm is used, to solidify by means of the beam emitted a photo-curing polymer in the liquid state which is in a special tank; DLP printing (Digital Light Processing), according to which a photo-curing polymer, again in the liquid state in a tank, is exposed to the luminous radiation emitted by a device similar to a projector.

According to both these technologies, the printing process proceeds making one layer after another, that is, solidifying a first layer adhering to a supporting plate (or extraction plate) and then a second layer adhering to the first layer and so on until formation of the complete object. Therefore, according to this technology, the data representing the three-dimensional object to be formed are organised as a series two-dimensional layers which represent transversal sections of the object.

According to the Bottom-Up method, applied to machines both of the SLA and DLP type, the plate for extracting the object moves from the bottom upwards, with a layer-by-layer tilting movement.

Basically, the method for formation of three-dimensional objects comprises:
- a software subdivides the 3D model, provided as input for the printing, in an ordered succession of layers, with the thickness determined according to the technology adopted, the opacity of the polymer, the quantity of the catalyst, the degree of precision to be obtained and the characteristics of the machine provided, usually between 50 and 200 microns, but in any case a succession of a discrete and finite number of layers;
- an extraction plate, consisting of a material which is able to facilitate the gluing on itself of the first layer of polymer, moves to a predetermined distance from the first layer and waits for the light beam (SLA or DLP) to solidify the first layer; it then raises by a distance sufficient for the layer just formed to detach from the base of the tank (usually approx. 1 mm) and then lowers by the same distance, less the predetermined distance for the formation of the second layer, and so on until forming the entire object.

The resulting to and fro movement, also called the tilting movement, has two main purposes: it allows the layer just formed to detach from the base of the tank, and at the same time it allows a new quantity of liquid resin not polymerised to interpose between the layer just formed and the base of the container, to allow the refreshing of material still in the liquid state beneath the layer already solidified, for the curing and the formation of the next layer.

In order to summarise the above-mentioned system with a mathematical model it is possible to identify the following parameters:

tc=exposure time of the luminous beam for curing the polymer (a function in particular of the electromagnetic power of the spectrum of interest dispensed by the luminous source and the ambient working conditions, absence of oxygen, intensity and covering capacity of the colour of the polymer, quantity of catalyst)
s=thickness of layer
n=number of layers formed
d=tilting distance of the extraction plate
h=height of object to be printed
tb=tilting time
vb=tilting speed
T=total time for printing three-dimensional object from which it may be deduced that the number n of layers to be hardened will be equal to the ratio between the height h of the object to be printed and the thickness s of the layer to be solidified, according to the equation:

$$n = h/s$$

The tilting time is defined as the time taken for the extraction plate to travel the distance d+(d−s), that is, the distance of rising of the plate for the renewal or refreshing of the resin, added to the distance for return to the printing position, decreased by the thickness of the layer to be produced, which gives:

$$tb = (d+(d-s))/vb$$

which means that the printing process requires a total time of:

$$T = n*(t+t_b) = \frac{h}{s} * \left( t + \frac{d+(d-s)}{v_b} \right)$$

This equation represents, in fact, the characteristic equation of the printing time of the DLP technology, which may be enriched with further elements, such as, for example, a differentiation between the tilting speed when raising and when lowering (it tends to slow down during the detaching phase when raising to avoid too high a mechanical stress of the layer just formed), the rest time, to be added subsequently to the light exposure time of the layer to allow the resin, as soon as it is solidified, to consolidate the interactions and therefore be more resistant to the mechanical stress which tends to detach it from the base, and so on.

With regard to the characteristic equation of the printing time for the stereolithographic printing technology, it should be noted that there is a substantial difference with respect to the equation relative to the DLP technology. It is evident, in fact, how the DLP technology depends exclusively on the height of the object to be printed and not on its shape or its volume, given that the surface of the layer which is formed is all projected simultaneously, which is not the case for the stereolithographic technology. In effect, with the same power dispensed by the light sources in the two cases, the stereolithographic technology uses a laser, which takes time to scan the entire surface of the single layer to be produced.

The characteristic equation of the printing time for the stereolithographic printing technology will therefore also be dependent on the volume of the object to be printed.

Consequently, where
Sn=surface of Nth layer;
Ss=scanning surface of laser beam;
tp=time of persistence of the laser beam on the unit of surface Ss;
tl=latency time, that is, the time taken by the laser beam to move on the next Ss;
the curing time of the single layer is:

$$(Sn/Ss)*(tp+tl)$$

and therefore, by summing all the n layers:

$$\sum_{1}^{n} \frac{S_n}{S_s} * (t_p + t_l)$$

from which the characteristic equation of the printing time of the stereo lithographic printing technology is:

$$T = (n*t_b) + \sum_{1}^{n} \frac{S_n}{S_s} * (t_p + t_l) = \frac{h}{s} * \frac{d + (d-s)}{v_b} + \sum_{1}^{n} \frac{S_n}{S_s} * (t_p + t_l)$$

which, as already mentioned, is dependent not only on the height of the object to be formed but also on its volume.

Consequently, whilst the printing time for the DLP printing technology, indicated with TDLP, in order to simultaneously produce two objects of equal height would not change in any way, the printing time for the stereolithographic printing technology, indicated with TSLA, would be dependent (less the tilting time, to be considered equal) on the sum of the two single characteristic printing times of the two objects.

The previous paragraphs have dealt with two of the three main issues concerning the three-dimensional printing process by photo-curing, the one connected to the mechanical management aspects, which are of interest to the formation in successive layers, and the one relative to the time equations which determine the characteristics of the printing dynamics management software.

The third issue, which is no less important, concerns the characteristics of the resin collection system, the so-called tank, which has the purpose of not merely containing the liquid polymer from which the printed three-dimensional object is obtained by photo-curing, but also facilitating the formation and the detachment of the layer which has just been formed, and facilitating the gluing towards the extraction plate, without the mechanical strength adversely affecting the integrity.

By analysing the characteristics of the prior art solutions it is possible to summarise the bottom-up collection systems, both for the DLP and SLA technologies, as follows:
container of the resin, with hollow base;
material transparent to UV rays for covering the base;
layer of non-stick material for covering the transparent material.

A hole is made, usually at the centre of the collection system, to allow the passage of the light beam for triggering the photo-curing phenomenon; the hole is covered with glass which has excellent UV ray transparency characteristics (in order not to lose incident luminous power), such as, for example, quartz and borosilicate glass. Lastly, the most important part to allow the correct performance of the process certainly concerns the coverage of the glass with a non-stick material, to allow the first layer to adhere to the extraction plate and the successive layers to join together in sequence.

The failure of this process would result in the falling of the layer just formed onto the base of the tank, interrupting the forming process and causing the failure of the printing routine.

The limiting effects of this technology, which render the production of the object very slow (up to hours per centimeter), very unstable and with the capacity to make objects with small dimensions, are investigated below.

SUMMARY OF THE INVENTION

The first limitation in the adoption of the prior art technologies is that of the so-called suction effect, which occurs between the surface of the object and the non-stick material which covers the sheet transparent to the UV rays, positioned on the base of the tank.

It is noted immediately how the optimum conditions for the occurrence of this phenomena arise. In effect, the layer immerses in the resin until it is at the distance s (thickness of the Nth layer) from the non-stick membrane (both the surfaces are coplanar and perfectly flat to give precision to the layers which will be formed); so a new layer is generated by photo-curing. The absence of air in fact creates the vacuum between the two surfaces, which are surrounded by a liquid with a higher viscosity, and the two surfaces in contact are as large as possible; the mechanical stress suffered by the system and, consequently, by the new layer being formed (which is only a few tenths of a millimeter in thickness) is enormous, with the risk of tearing the layer which has just been formed, which will not attach to the upper surface, leading to the interruption of the printing process.

In order to reduce the effects of this phenomenon, the process proceeds in such a way that the surface of the extraction plate and of the objects to be created are sufficiently small (usually with technologies of this type objects are created with dimensions of approx. 4×4, 5×5 centimeters) and at the same time the raising speed of the plate during the tilting step is extremely reduced (it should be noted how this speed vb appears in the time equation of both the technologies), considerably increasing the printing time (generically the tilting time is approx. 40% of the total time).

The second issue, which is fundamental in the understanding of the dynamics of formation of a three-dimensional printed object in the bottom-up photo-curing techniques is that of the non-stick capacity of the layer positioned above the base glass.

This type of three-dimensional printing is based on the capacity of the layer just formed to link, in the first layer to the extraction plate, and in the successive layers to the layer which precedes it. If, however, the mechanical strength set up by the lower membrane is greater than the cohesion force of the upper membrane, the hardened layer will inevitably remain on the base of the tank, interrupting the process for creation of the three-dimensional printed object.

According to the prior art, an attempt has been made to resolve this difficulty with the use of various materials with these characteristics; the use of particular silicones, such as, for example, the bi-component SF45, which, with its elastic characteristics, also enables a reduction in the above-mentioned suction effect; or polytetrafluoroethylene (PTFE), which is currently one of the materials with the highest level of non-stick properties available on the market.

In order to reduce this effect and therefore allow an acceptable printing success it is also possible to intervene on two elements: the time of exposure to the light source (t) and the tilting speed (vb). In effect, by increasing the exposure, and therefore dispensing more energy, the layer which is formed tends to increase its thickness, but as it is forced in a predetermined thickness (s) it compresses towards the upper layer, increasing the tearing resistance from the non-stick membrane, but losing precision in the shape of the object, due to the formation on the side surface of the object of a series of small steps, a phenomenon known in the sector as saw-tooth surface. With regard to the tilting speed, slowing down the rising of the plate gives more time to the layer formed to detach from the membrane, which will release more gradually, thus increasing both the precision and the probability of printing success.

It is clear, making reference to the characteristic time equations, how both the proposed solutions result in not only an inevitable loss of precision of the model made, but a considerable increase in the printing time, interventions which will inevitably lead to the making of objects with a height of just a few centimeters in many hours.

The solution according to this invention in inserted in this context, which proposes to eliminate the suction effect, eliminate the adherences between the layer being formed and the tank base, reduce the mechanical stresses introduced by the above-mentioned effects, reduce the mechanical stresses introduced by the tilting, provide a process for forming in much shorter times compared with prior art solutions.

These and other results are obtained according to this invention by providing a method and apparatus for photo-curing with self-lubricating substratum for the formation of three-dimensional objects which, unlike the prior art bottom-up 3D printing methods and apparatuses, comprises the interposing between the base of the tank and the photo-curing resin of a membrane, which is transparent to the electromagnetic spectrum of interest, is able to gradually release a layer of lubricating material which allows the polymer, suitably doped, to solidify, remaining suspended on this layer of lubricating material.

The aim of the invention is to provide a photo-curing method and apparatus for the formation of three-dimensional objects which allows the limitations of the prior art methods and apparatuses to be overcome and to obtain the technical results described above.

A further aim of the invention is that the method and the apparatus can be implemented with substantially low costs, with regard both to the production costs and the management costs.

Another aim of the invention is to provide a photo-curing method and apparatus for the formation of three-dimensional objects which are simple, safe and reliable.

A first specific object of this invention therefore relates to a method for forming three-dimensional objects by photo-curing a photo-curing liquid polymer exposed to a radiation, wherein said three-dimensional objects form by growth, due to the progressive curing of said photo-curing liquid polymer, in the space between a sheet transparent to the radiation and a supporting plate, that is, a portion already formed of said objects, said supporting plate progressively moving away from said transparent sheet, characterised in that on the side of said transparent sheet facing towards said photo-curing liquid polymer a membrane is placed, being transparent to said radiation, covered by a layer of liquid lubricant, which is released gradually by said membrane.

Preferably, according to this invention, said photo-curing liquid polymer in turn contains said liquid lubricant.

A second specific object of this invention relates to an apparatus for forming three-dimensional objects by photo-curing a photo-curing liquid polymer by exposure to a radiation, of the type comprising a tank for collecting said photo-curing liquid polymer, the bottom of the tank having a hole covered by a sheet, said sheet being made with a material transparent to said radiation, and a supporting plate designed to move away from the sheet, characterised in that, on the side of said sheet facing towards said photo-curing liquid polymer, a membrane is arranged, said membrane being transparent to said radiation, said membrane being covered by a layer of liquid lubricant, which is released gradually by said membrane.

Preferably, according to the invention, said membrane is made with a self-lubricating polymer, ie a polymer inside of which there is a liquid lubricant, and more preferably said polymer is silicone and said liquid lubricant is silicone oil, with a viscosity of between 50 and 1000 mm$^2$/s (defined according to the centistoke model cSt at 23° C.), preferably between 300 and 400 mm$^2$/s.

Lastly, according to the invention, polytetrafluoroethylene (PTFE) is preferably present inside the membrane.

The efficiency of the method and apparatus for photo-curing with self-lubricating substratum for the formation of three-dimensional objects according to this invention is evident, which allows a formation of the three-dimensional object of the sequential partially continuous type. In effect, as will be described below, this system completely eliminates the need to use a tilting extraction system, and in some conditions it is able to form the final product in a continuous manner.

In effect, according to the method and apparatus for photo-curing with self-lubricating substratum for the formation of three-dimensional objects according to this invention, there is no longer the use of a tilting system, the insertion of a layer of lubricating oil released by the membrane gradually over time allowing the two characteristic problems of the traditional bottom-up systems to be resolved, that is, the detachment of the layer just formed from the tank base and the refreshing of the liquid polymer between the layer just formed and the tank base.

Also, the polymer in the liquid state, suitable doped, as it hardens remaining suspended on the oily lubricant layer, no longer makes contact with the base of the tank, so there is no longer the need to raise the extraction plate to detach the layer which has just been formed.

Lastly, with regard to the problem of refreshing the liquid polymer, this has been resolved, except under particular conditions, which will be described below, so it is possible to define the sequential system (that is, without the need for tilting of the extraction plate), but only partially continuous, since, as will be described below, only in certain conditions is it possible to obtain the refreshing of the liquid polymer faster than the polymerisation time and therefore not require the system to interrupt the extraction process whilst awaiting that all the new portion of area to be solidified is actually tempered by the resin.

BRIEF DESCRIPTION OF THE DRAWINGS

The invention is now described, by way of example and without limiting the scope of the invention, with reference to the accompanying drawings which illustrate preferred embodiments of it, in which.

DETAILED DESCRIPTION

By way of an example of the method and the apparatus according to this invention a bottom-up type method for making three-dimensional objects has been used, in which the object is formed from the bottom upwards, and the photo-curing is obtained with a digital type system for processing the luminous flow. The materials used for the photo-curing process are polymers originally in the liquid state, suitably doped with ultraviolet catalysts and lubricating substances.

Figure 1:
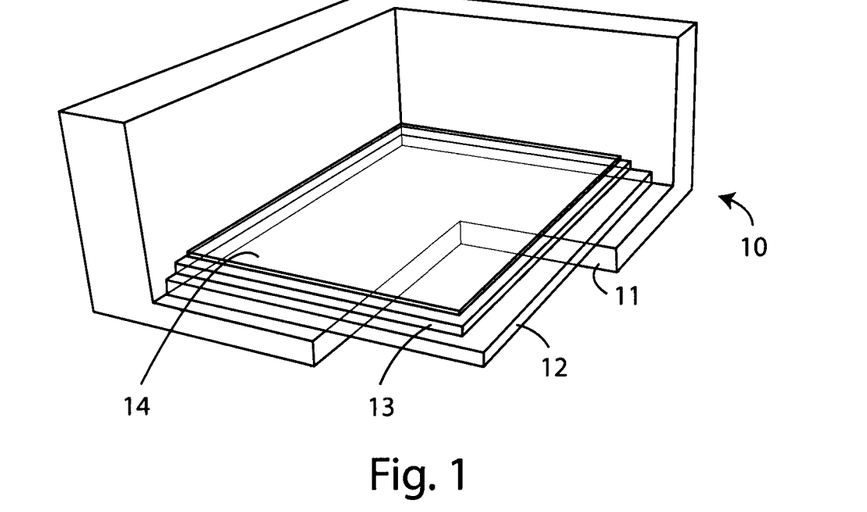
FIG. 1 shows a cutaway perspective view of a tank for an apparatus for forming an object by means of photo-curing, in which a self-lubricating membrane is inserted according to this invention.

With reference to FIG. 1, the collection tank of the apparatus for photo-curing with self-lubricating substratum for the formation of three-dimensional objects according to this invention, denoted in its entirety with numeral 10, has in a central position a hole 11, which allows the passage of the incident luminous flow coming from a light source (not shown) located beneath the tank 10. The hole 11 is covered by a sheet 12, which may be made of borosilicate or quartz, or in any case of a material transparent to the UV spectrum, and more specifically, in the systems which use a digital projector of the DLP type for commercial use, transparent to a tail of the electromagnetic spectrum of the visible towards the ultraviolet band.

The sheet 12 positioned on the base of the tank 10 not only has the purpose of preventing any escape of the liquid polymer contained in the tank, but also that of performing the function of constraining downwards when the first layer is formed, which will tend to remain attached, by compression, to the extraction plate (not shown), made, by way of example, of aluminium.

Figure 2:
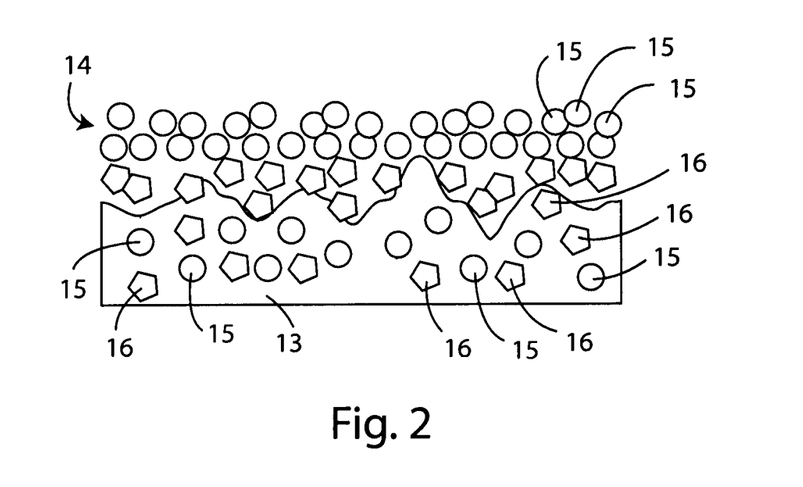
FIG. 2 shows a schematic view of the operation of the self-lubricating membrane according to a first embodiment of this invention.

Above the sheet 12 there is a membrane 13, made of a self-lubricating, silicone-based polymer with a low friction coefficient and a high resistance to wear, made using a mould and specific doping, which will be described in more detail below, which is able to release (as shown in FIG. 2) a layer of silicone and non-stick material, labelled 14, which in the system performs the role of buffer between the membrane 13 and the photo-curing polymer, the purpose of which is to prevent the triggering of the suction effect and the mechanical adherence characteristic of the prior art bottom-up systems, and for that reason indicated below with the name of inhibiting layer 14. Moreover, the polymer in the liquid state, remaining suspended above the inhibiting layer 14, allows a process to be obtained, according to this invention, which, as will be described in detail below, with particular reference to the determination of the time equation, may be defined sequential and, at least partially, continuous, finally eliminating the tilting routine, which is essential in the prior art systems.

More specifically, for the testing phase of this invention, use has been made, by way of example and without limiting the scope of the invention, of silicone-based polymers with the following characteristics: thickness of the membrane between 0.50 mm and 2.50 mm, Shore hardness between 55 and 70, failure load from 8 to 10 MPa, percentage elongation at failure from 300 to 400.

The best results (in terms of duration of the membrane) have been obtained with 70 Shore hardness, but membranes can be used with a wide range of hardness.

However, it should be noted that it is still possible to use other types of materials with transparency characteristics, elasticity release of lubricants similar to those used.

Again with reference to FIG. 2, the silicone oil (dissolved inside the membrane in the form of pellets denoted with numeral 15) is a lubricant which, when it is present in the self-lubricating polymer with which the membrane is made 13, migrates from the inside of the material towards the outside, until reaching the surface, even during the use of the membrane 13, thereby contributing to the reduction of the friction and generating an inhibiting substratum 14 above which the polymer still in the liquid state remains suspended.

More specifically, by way of example and without limiting the scope of the invention, the lubricant contained in the membrane 13 consists of a silicone oil with a viscosity of 350 mm$^2$/s (defined according to the centistoke model cSt at 23° C.). However, it is possible to use silicone oils with various viscosities, in a range of between 50 and 1000 mm$^2$/s. Also, as will be described below, the silicone oil may have polytetrafluoroethylene (PTFE) additives (labelled 16 in FIG. 2).

By way of an example, it is possible to use as a lubricant fluid resins of the type used for releasing moulds: for example, resin 9515 from Siliconi Padova used as a mould-release, as well as silicone oils of the Rhodorsil Huile 47 V 50 type also supplied by Siliconi Padova, produced by BlueStar Silicones.

In the method and apparatus for photo-curing with self-lubricating substratum for the formation of three-dimensional objects according to this invention, the need to maintain the lubricating layer, at least for the entire printing process, has resulted in the use of silicone oils with a higher viscosity, since they form more easily a persistent layer on the entire interdiction surface.

With regard to the viscosity of the lubricating oil, it is possible, as mentioned above, to use oils with viscosity characteristics distributed over a wide range: from 50 to 1000 $mm^2/s$ (defined according to the centistoke model cSt at 23° C.), with the best results in the range 300-400 $mm^2/s$. PTFE can be added to the oils and other lubricating products can be used such as resins for releasing moulds such as, for example, resin 9515 by Siliconi Padova.

The advantages of the silicone-based additives are represented by the reduction of the friction coefficient and the wear factor.

With reference to FIG. 2, excellent synergic effects are available if the silicone is coupled with the (labelled with the numeral 16), which tends to migrate towards the outside of the membrane 13 before the silicone oil 15, creating a substrata which reduces the roughness of the membrane 13 and increases considerably the duration.

With regard to the choice of photo-curing polymers, according to this invention it is possible to use the resins already in use in the 3D printing sector, preferably with the addition of lubricant of the same type as that contained in the membrane placed at the base of the tank. This enables the mechanical suction effect and the dilution of the lubricant contained in the membrane 13 by the liquid polymer to be reduced.

The best results are obtained with percentages of lubricant dissolved in the photo-curing liquid polymer of 4-6%, but quantities of lubricant can be used which vary within a wide range according to the solubility and the desired characteristics of the solidified material. In effect, the greater the quantity of lubricant the more the solidified surface is opaque and with a satin finish.

Spot-A Materials resins have been tested, in particular Class HT and Class LV.

More specifically, the following tests have been performed in the apparatus built with the function of scientific demonstrator:

96% Resin type HT+4% Silicone Oil: polymerisation time at a distance of 200 mm equal to 990 ms, tempering time for 6 mm equal to 1100 ms, thickness of layer 200 microns, duration of printing of silicone membrane in the same point 280 mm;

96% Resin type LV (Low Viscosity)+4% Silicone Oil: polymerisation time at a distance of 200 mm equal to 600 ms, tempering time for 6 mm equal to 400 ms, thickness of layer 200 microns, duration of printing of silicone membrane in the same point 80 mm (printing performance almost double with respect to the HT but extremely aggressive for the duration of the membrane);

80% Resin type HT+16% Resin type LV (Low Viscosity)+4% Silicone Oil: polymerisation time at a distance of 200 mm equal to 800 ms, tempering time for 6 mm equal to 800 ms, thickness of layer 200 microns, duration of printing of silicone membrane in the same point 160 mm (compromise condition with the use of 1 mm thick membrane);

More specifically, with regard to the possible presence of PTFE 16 in the membrane 13, in addition to the lubricant 15, it has been seen that the presence of PTFE in the lubricant improves the lubrication characteristics, reduces the friction and improves the duration of the membrane 13 reducing the wear, but it is not essential. The phenomena described also occur with lubricants only based on silicone oils or with lubricating resins for mould release.

Lastly, it has been seen that, during the formation of the object, the lubricating material which covers the membrane 13 tends to be removed; this reduction of the inhibiting layer 14 results in the contact of the resin (that is, the photo-curing liquid polymer) with the membrane 13, generating all the undesired effects known in the bottom-up systems.

Figure 3:
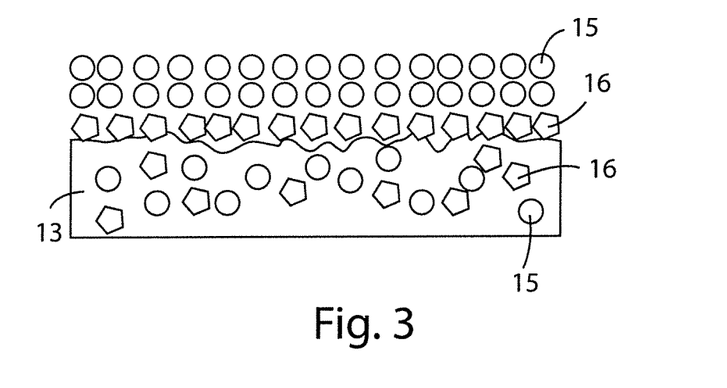
FIG. 3 shows a schematic view of the operation of the self-lubricating membrane according to a second embodiment of this invention.

In order to limit this problem, the self-lubricating membrane 13 is preferably made according to a technique for injection of the basic polymer, in the liquid phase, suitably doped with silicone oil and PTFE, inside a hot steel mould, the faces of which have undergone a double mirror-finish and chromium-plating treatment, and waiting the time necessary for the solidification. With reference to FIG. 3, this intervention allows the surface roughness of the membrane 13 to be reduced (in addition to the presence of the PTFE particles), increasing considerably the duration of the printing.

The surfaces of the mould must be treated with suitable mechanical finishing to obtain adequate surface roughness of the membrane. More specifically, the liquid polymer side surface must be particularly smooth. It is worthwhile subjecting the wall of the mould to be used for forming the surfaces to a chromium-plating and polishing treatment. This intervention enables the surface roughness of the membrane to be reduced and to increase the duration of the printing, before it deteriorates.

The experimental data obtained with the scientific demonstrator validate these arguments. In effect, for a membrane with a thickness of 1 mm, doped with silicone oil, used to make an object with 200 micron layers, obtained from a mixed HT-LV-Oil resin; if the membrane has been made by injection with a sandblasted mould, its duration is 80 mm on the same point, with a mould polished on the upper face it is 250 mm on the same point and with a mould polished and chrome-plated on the upper face it is 380 mm on the same point.

Summing up, the increase in the duration of the membrane in the printing process is linked to its surface finish; the smoother the surface in contact with the resin, the greater the increase in performance in terms of duration.

Another possible intervention is that of post-working the membrane obtained by injection with a plasma treatment (used for the sterilisation of medical instruments) which has the purpose of intervening on the surface at a molecular level to close surface pores.

By way of example and without limiting the scope of the invention, the means of operation is described below of the method and apparatus for photo-curing with self-lubricating substratum for the formation of three-dimensional objects according to this invention.

Figure 4:
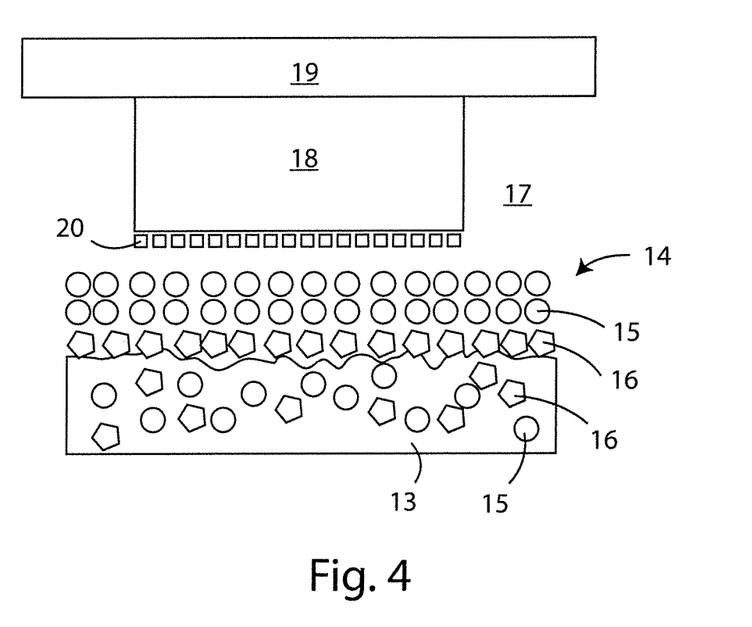
FIG. 4 shows a schematic view of the operation of the system for forming objects by photo-curing according to a first embodiment of this invention.

As already described in the previous pages, and with reference to FIG. 4, the presence of a membrane 13 made of self-lubricating material suitably doped and treated results in a slow migration of the particles 15 of silicone oil, and more generally of lubricating material, towards the surface of the membrane, creating an extremely thin surface layer 14, known as lubricating inhibiting layer 14; a contact interface is therefore generated between the resin 17 which is still liquid and the membrane 13, in which the resin, instead of coming into contact with the surface of the membrane 13, tends to float on the interface; the photo-curing process therefore occurs suspended on a lubricating inhibiting layer 14 of silicone oil, which allows to: eliminate the suction effect between the object formed 18 and the membrane 13, eliminate the adherences between the object formed 18 and the membrane 13, reduce the mechanical stresses introduced by the above-mentioned effects, reduce the mechanical stresses introduced by the tilting, allow a formation process in much shorter times than the prior art solutions.

As will be described below, with reference to the determination of the equation of the time for formation of an object 18 using the method and apparatus according to this invention, the process allows the formation of the object 18 without the need for tilting. In effect, the object 18 does not need to be pulled from the tank base, because it is already suspended on it, in the interface between the lubricating inhibiting layer 14 and resin/polymer 17. This suspension also allows the liquid polymer or resin 17, whilst the extraction plate 19 raises to make space for the new cured formations, to penetrate in this interdiction layer, allowing not only sequential printing, but also continuous printing.

However, in order to achieve this aim, it is necessary for the resin, that is, the liquid polymer 17, to infiltrate sufficiently fast so that the layer 20 which is being formed does not solidify before it has been able to completely temper all the new surface to be cured.

Figure 5:
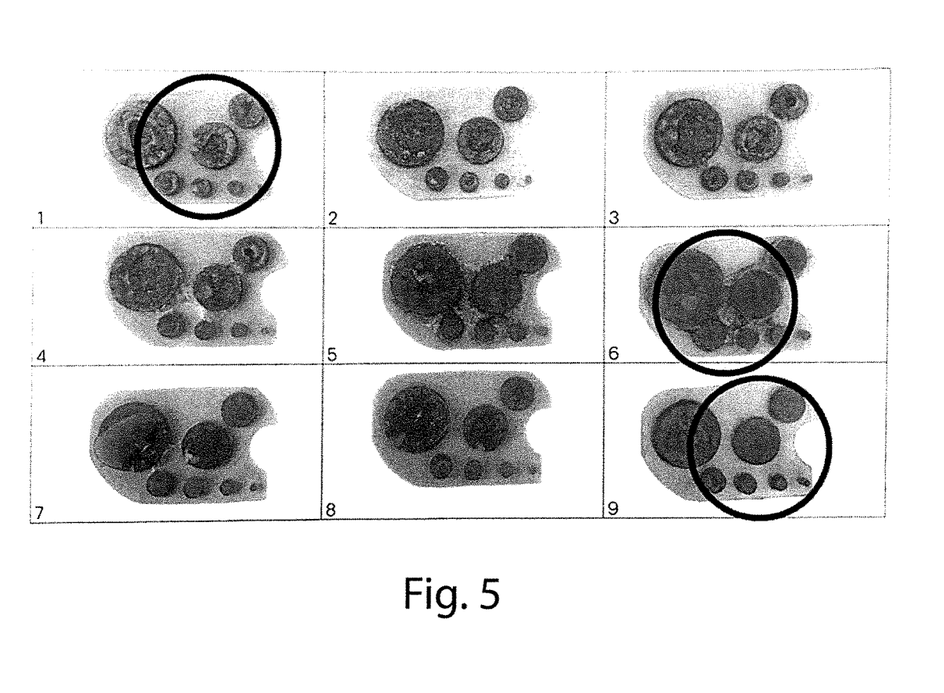
FIG. 5 shows a series of sample obtained by photo-curing with various times for polymerisation and refreshing of the resin/polymer.

Experimental testing of the above is shown in FIG. 5, wherein the squares show the printing samples obtained with variations in the polymerisation times and the tempering times, with the use of resin of the mixed HT-LV-Oil type.

From the image of square 1 and that of square 6, the objects have been obtained by layers of 200 microns, with sequential printing, keeping constant the tempering time tba 350 micron and varying only the polymerisation time from the 700 ms of square 1 to the 1200 ms of square 6; the two expected phenomena can be seen immediately:

the polymerisation time is already corrected to 900 ms in square 3; the over-polymerisation phenomena due to over-exposure are evident in squares four to six;

already in the first square, in the larger sized cylinders (3, 4, 5, 10, 20 mm diameter), it may be clearly seen how the central part of the cylinder is empty and ruined; this is because the tempering time of the resin of 350 ms was insufficient to guarantee the complete refreshing of the new layer being formed.

It may be seen, however, in squares 7 to 9, in which the value of the polymerisation time was kept fixed at 900 ms for a layer of 200 microns, and the tempering times were increased up to 1500 ms in square 9, how the cylinders are fully formed up to the thickness of the 15 mm diameter.

This experiment characterises and validates in an unequivocal manner the time equation which will be described below in more detail, and which provides for the balancing between polymerisation time and tempering time, in a sequential production system, at least partially continuous.

Under ideal conditions, in order to reach the aim of an exclusively continuous printing it would be necessary for the tempering speed to be in any case sufficiently high for the resin to coat the entire surface of the extraction plate (which corresponds to the maximum printing dimension) in a time which is in any case less than the characteristic polymerisation time.

In order to reduce the refreshing time of the polymer beneath the portion of object already formed it is necessary to intervene on the tempering speed. This parameter depends on many chemical/physical characteristics of the resin in use (that is, of the photo-curing liquid polymer in use) and lowering the viscosity is certainly one of the interventions which gives the best results.

Figure 6:
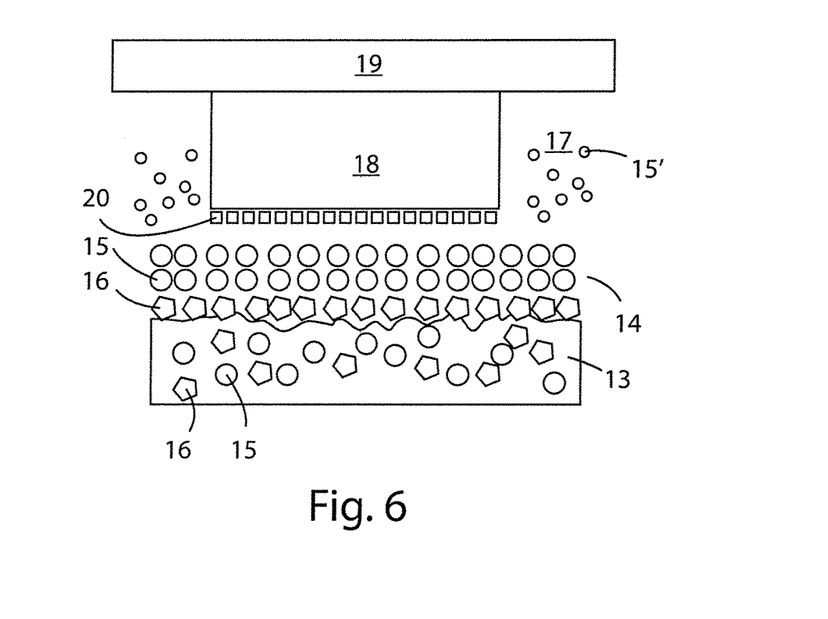
FIG. 6 shows a schematic view of the operation of the system for forming objects by photo-curing according to a second embodiment of this invention.

With reference to FIG. 6, one of the elements of greatest innovation of the technology according to this invention is that of having introduced the concept of doping the resin/polymer 17 with lubricating silicone oils 15' identical to those produced by the membrane 13. This intervention has clearly enabled the achievement of two important results: a considerable increase in the tempering speed, and therefore the possibility of continuously printing larger surfaces without the need to change to sequential printing; and a considerable increase in the duration of the self-lubricating material with which the membrane 13 is made, the resin/polymer 17 being doped with the same material as the interface, as they tend to consume more slowly the inhibiting layer 14.

With the adoption of this technology it has been necessary to review the "slicing" process of the three-dimensional object to be made.

Figure 7A:
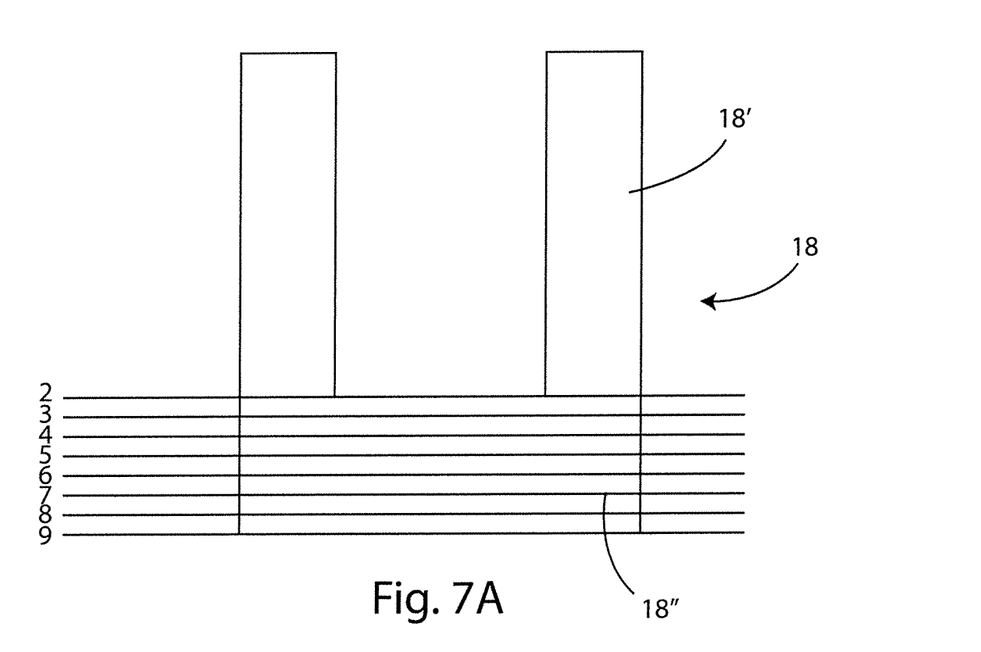
FIG. 7A shows a cross-section of an object used by way of an example of the formation process according to the invention, for assessing the means of operation of the process.

If one wished to produce a trilithon object 18 of the type shown in FIG. 7A, assuming that in the first layer formed (even though it would be incorrect to speak of layer, since the object 18 is formed in a continuous fashion) the surface of each single cross section of the column 18' of the trilithon object 18 is sufficiently small to allow the refreshing of the resin/polymer during the polymerisation of the layer, in this case the extraction process would be continuous, when the layer relative to the beam 18" is reached, the cross section of the object 18 becomes so great that the refreshing time of the resin/polymer is greater than the polymerisation time; in this case the system is forced to stop to allow the completion of the refreshing of the resin/polymer, to then change to a system which is no longer continuous, but sequential.

Figure 7B:
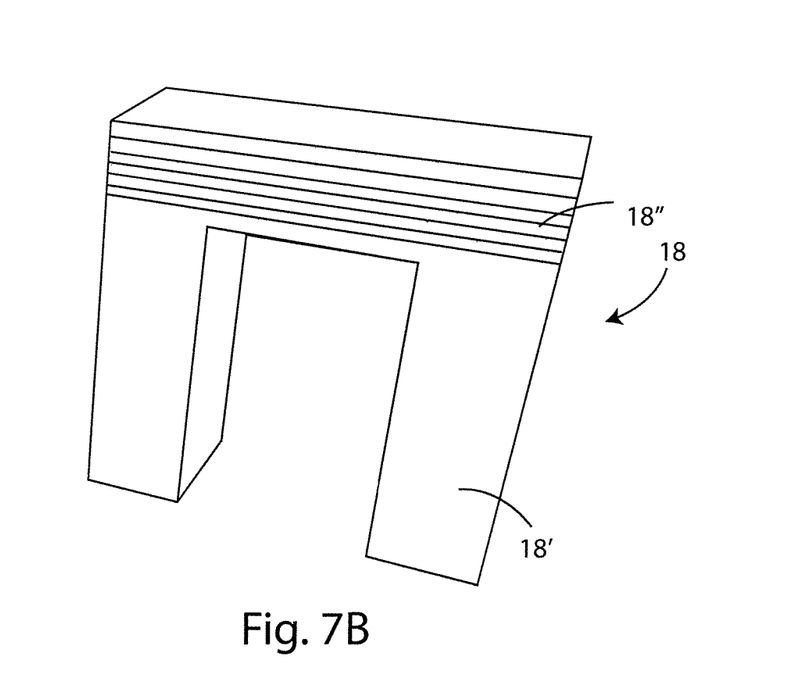
FIG. 7B shows a perspective view of the object of FIG. 7A.

Considering again the example of the trilithon object 18 mentioned above and shown in FIG. 7, it is possible to summarise the new extraction characteristics as follows.

The tilting process, which is characteristic of the photo-curing systems according to the prior art, has been totally overtaken by passing to a sequential movement; the object 18 being formed suspended on the lubricating inhibiting layer 14 must no longer be detached from the base of the tank, and if the surfaces in question are sufficiently small to allow the immediate refreshing of the resin/polymer 17, the limit of continuous extraction is reached.

Described below is the mathematical model which characterises the technology according to this invention, highlighting the characteristics which determine the mixed extraction system, which may be defined as sequential partially continuous.

Figure 8:
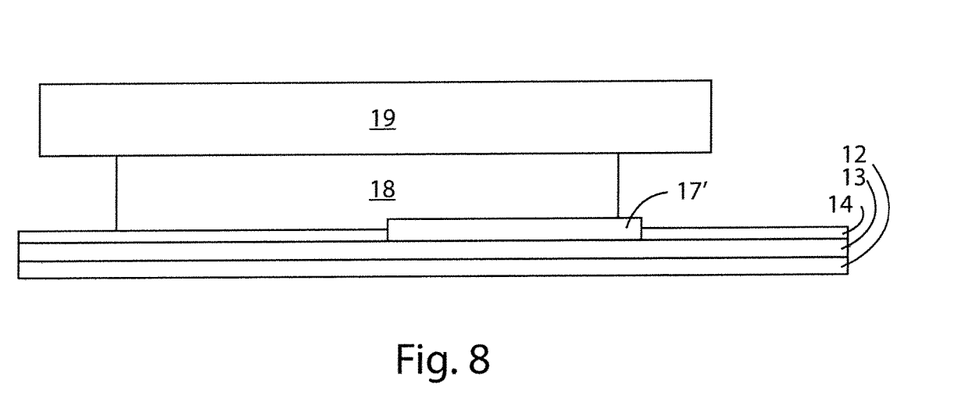
FIG. 8 shows a schematic view of the operation of the system for forming objects by photo-curing according to a third embodiment of this invention, with reference to the determination of the time for renewal of the resin/polymer.

It is possible to define:
H=total height of object to be produced
hn=thickness of the Nth layer
n=Nth layer
|xn,yn|max=maximum linear dimension of the section of the Nth layer
tp=polymerisation time per unit of height
tr=tempering time or time of refreshing resin/polymer
vp=polymerisation speed in the continuous printing status
vb=tempering speed or speed of refreshing resin/polymer
T=total printing time of object With reference to FIG. 8, which shows a graphical representation of the refreshing time or tempering time, that is, the time in which the resin 17' in the liquid state passing between the object 18 which has solidified and the lubricating inhibiting layer 14 covers the entire surface to be printed.

Figure 9:
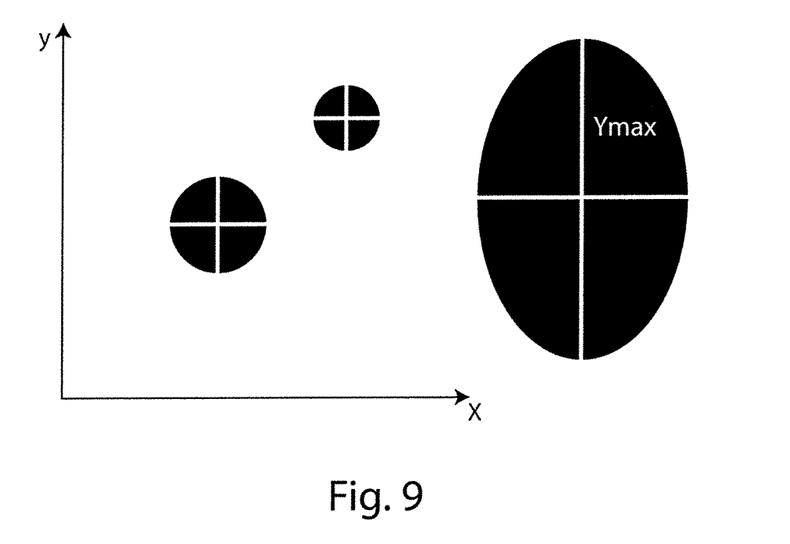
FIG. 9 shows a cross-section of an object during formation, with indication of the key measures for determining the renewal times of the resin/polymer.

The time tr can therefore be defined for each Nth layer and it is dependent on two factors, the tempering speed (vr) and, as shown in FIG. 9, the tempering distance, defined by the operator |Xn,Yn|max, that is, the maximum coordinate x, y produced by the largest surface to solidify in the Nth layer.

With regard to the refreshing speed of the resin/polymer, which is dependent on many factors (temperature and viscosity of the liquid, friction coefficient of the surface of the object just solidified, friction coefficient of the lubricating inhibiting layer, etc), it will initially be considered constant in the application in question, in view of the limited distances in question.

Attention is only drawn to the dependency of the refreshing speed on the viscosity of the photo-curing polymer, because this is one of the elements of intervention of the technology according to this invention to increase the value of vr, and therefore tend towards an exclusively continuous process.

It is therefore possible to define the time of refreshing the Nth layer:

$$t_m = \frac{|x_n, y_n|_{max}}{v_r}$$

total number of layers N:

$$N = \frac{H}{h_n}$$

from which the characteristic time equation of the sequential component of the technology according to this invention is obtained:

$$T = \sum_1^N t_m = \sum_1^N \frac{|x_n, y_n|_{max}}{v_r}$$

Lastly, there is the application condition, which will be valid if the polymerisation time tp of the Nth layer is less than the refreshing time tr of the same layer. In effect, if the resin which is penetrating solidifies before covering the entire surface to be polymerised, the central part will be inevitably hollow, generating, as shown in the experimental tests in the following examples, a sort of ring doughnut effect.

On the contrary, if the polymerisation time of the Nth layer were greater than the refresh time (if vr is considered to be the constant for the system, tr depends only on the operator |x,y|max, that is, on the maximum dimension between the surfaces to be solidified), one would change to a continuous type extraction system. For this reason, the discrete layer concept would be lost, passing to an analysis of an integral type. Therefore, the Nth layer of infinitesimal thickness is defined as dn, H is the height of the object to be printed and vp is a constant equal to the polymerisation speed, dependent in first approximation on the characteristics of the light source and on the type and quantity of catalysts which make up the resin/polymer, from which it is possible to define the characteristic time equation of the component in continuous mode simply as:

$$T = \int_0^H \frac{dn}{v_p} = \frac{H}{v_p}$$

From the above, if the object to be produced satisfies the condition by which, for all its height H, the refreshing time is always less than the polymerisation time of the Nth layer, the printing is fully continuous, achieving the best performance possible, obtaining the shortest printing time and the best mechanical quality of the object, which loses the classic step-like formation of the technologies according to the prior art.

For this reason, as already described previously, the aspects of the invention which are able to most improve the printing conditions are those aimed at increasing the refreshing speed, that is, the lowering of the viscosity of the liquid and the drastic reduction of the friction coefficient.

The following pages show the experimental data obtained by the scientific demonstrator used to empirically check the validity of this invention, which set out the values of the constants relative to the polymerisation and refreshing speeds to unequivocally determine the process performance obtained with the technology according to this invention.

It will be noted how, according to this invention, characteristic parameters of the DLP and SLA technologies, such as the tilting speed and time, the surface values of the Nth layer and the lowering times of the extraction plate, have all disappeared, both in the sequential component and in the continuous component of the reference equation, with a consequent reduction in the printing speed.

Lastly, it should be noted how the continuous component of the system according to this invention is dependent exclusively on the height of the object to be produced.

This means that, with the technology according to this invention, the quantity of objects simultaneously produced on the extraction plate do not influence the total printing time, which will depend exclusively on the height of the product.

Summing up, as mentioned in the introduction, any photo-curing system of the bottom-up type must deal with two main problems, which result from the need to form the object from the bottom upwards: creating non-stick systems to allow the attachment upwards of the layer which is being formed and reducing the mechanical stress generated by the suction effect, which acts on the extremely thin layer just formed.

Second level problems, which, if possible, are even more complex, which in any case must be dealt with for the success of the printing process according to the prior art technologies are the compression of the first layer on the extraction plate, the protection of the non-stick membrane subjected to continuous stress, which adversely affects the functionality and the duration over time, and, lastly, the containment of the electromagnetic absorption of the membranes, which are interposed between the light source and the photosensitive resin.

The technology according to this invention, the basic new and inventive concept of which lies in the formation and maintaining of the self-lubricating inhibiting substratum, fully answers all the above-mentioned issues. The success of the experimental results which will be seen in the following examples lies in the technology adopted, which does not attempt to alleviate but is able to avoid the problems associated with the suction effect and the adherence.

The following examples show the results of the comparison between the prior art DLP technology and the technology according to this invention, and, finally, the results will be compared between the attempted sequential printing with standard DLP technology and sequential printing with the creation of a lubricated substratum according to the technology of this invention.

Two scientific demonstrators have been prepared in order to analyse and compare the scientific assumptions, a traditional one of the DLP type and one with the adoption of the technology according to this invention.

Figure 10:
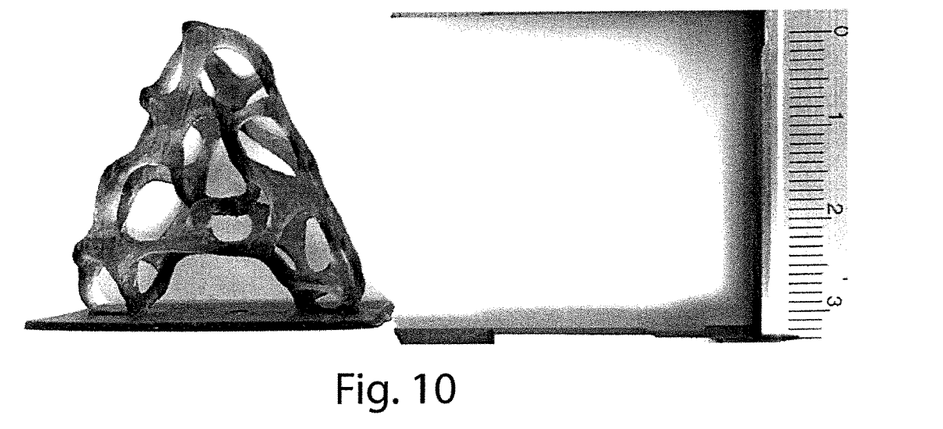
FIG. 10 shows a photographic image of the object obtained in example 1.

Example 1. Object Produced with DLP Technology and Tilting of the Extraction Plate Machine Used: Traditional scientific demonstrator DLP
Thickness of layers: 200 microns
Height of printed object: 35 mm
Formation time: 76 minutes
Printing Speed: 21.7 minutes/cm
With reference to FIG. 10, the printing quality is good, the object has a good mechanical strength and superficially it is precise; only the layering, due precisely to the tilting process, may be noted. No deformities are noted with respect to the file sent for printing. All the parts are printed. The base thickness is less than the millimeter planned due to overcompression of the first layers formed.

Example 2. Object Produced with DLP Technology, with Extraction without Tilting

Figure 11:
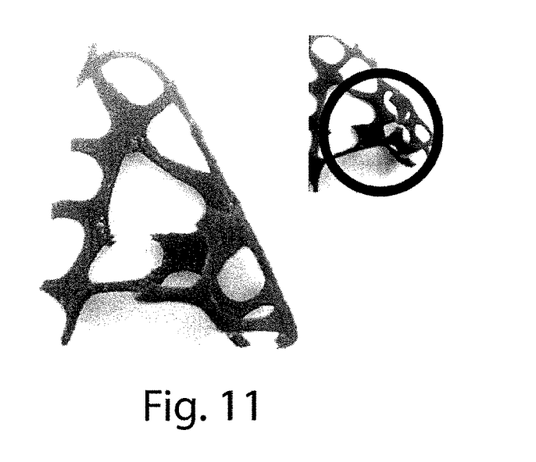
FIG. 11 shows a photographic image of the object obtained in example 2.

Machine Used: Traditional scientific demonstrator DLP
Thickness of layer: 200 microns
Height of printed object: 35 mm
Formation time: 227 seconds
Printing Speed: 1.8 minutes/cm
Notes: With reference to FIG. 11, the printing quality is not admissible, the surface is rough and undefined, not all the parts thicker than 0.5 mm have been formed. The object does not reproduce fully the product line. The base, which is too large, has not been made.

Figure 12:
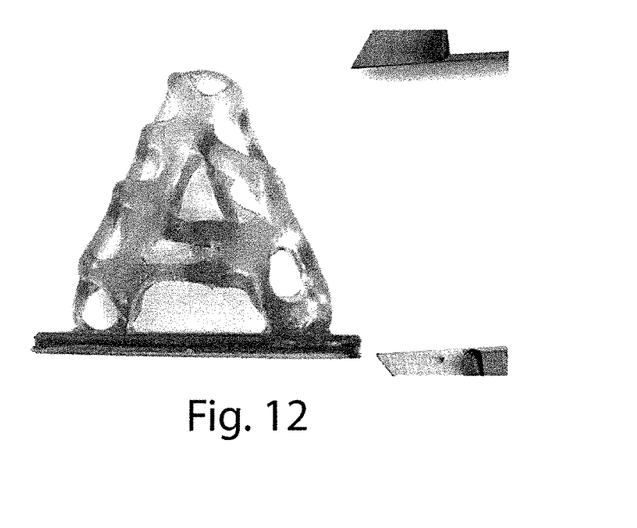
FIG. 12 shows a photographic image of the object obtained in example 3.

Example 3. Object Produced with Technology According to this Invention Sequential Partially Continuous Machine Used: Traditional scientific demonstrator DLP
Thickness of layer: 200 microns
Height of printed object: 35 mm
Formation time: 175 seconds
Printing Speed: 50 seconds/cm
Notes: With reference to FIG. 12, the printing quality is totally correct and the base is also correctly defined, which is the only part of the object made according to the sequential layout due to the size; the remaining part of the object is printed continuously, because the smaller surfaces have allowed for the tb to be less than the tp, so the object has been made with a speed of less than one centimeter per minute. The surface is perfect by analysing by sight and touch.

The results obtained have demonstrated how the method and apparatus for photo-curing with self-lubricating substratum for the formation of three-dimensional objects according to this invention, that is, the use of a tank made with a semi-elastic membrane of self-lubricating material, which is able to interpose between the membrane and the polymer to solidify a thin inhibiting layer, with a suitable doping of the original material, and a software which is able to manage the extraction times, allow a sequential and partially continuous process, which is considerably faster and more precise for forming the three-dimensional object.

The experimental conclusions have also shown how the method for photo-curing with self-lubricating substratum for the formation of three-dimensional objects according to this invention may be applied more generally to the making of three-dimensional photo-curing printers, allowing a speed of formation of the object of up to two orders of magnitude greater than the current technologies, which require a tilting movement of the extraction plate to allow the layer-by-layer layering process, without considering the mechanical benefits granted to the object itself, made according to this process instead of in a step-like fashion.

The present invention is described by way of example only, without limiting the scope of application, according to its preferred embodiments, but it shall be understood that the invention may be modified and/or adapted by experts in the field without thereby departing from the scope of the inventive concept, as defined in the claims herein.

What is claimed is:

1. A method for forming three-dimensional objects comprising exposing a photo-curing liquid polymer to a radiation, wherein said three-dimensional objects form by growth, due to progressive curing of said photo-curing liquid polymer, in a space between a sheet transparent to said radiation and partially formed portion of said objects affixed to a supporting plate, said supporting plate progressively moving away from said transparent sheet, wherein on a side of said transparent sheet facing towards said photo-curing liquid polymer, a membrane is disposed, the membrane being transparent to said radiation, and covered by a layer of liquid lubricant that is released gradually by said membrane, wherein said liquid lubricant is silicone oil.

2. The method of claim 1, wherein said membrane is made of a self-lubricating polymer.

3. The method of claim 2, wherein said self-lubricating polymer contains said liquid lubricant that is gradually released by said membrane.

4. The method of claim 3, wherein said liquid lubricant is insoluble in said self-lubricating polymer.

5. The method of claim 3, wherein said self-lubricating polymer includes a silicone polymer.

6. The method of claim 1, wherein said silicone oil is enriched with polytetrafluoroethylene (PTFE).

7. The method of claim 3, wherein said photo-curing liquid polymer also contains said liquid lubricant.

8. The method of claim 7, wherein said liquid lubricant is dissolved in said photo-curing liquid polymer in an amount of 4-6% by weight.

9. An apparatus for forming three-dimensional objects by exposing a photo-curing liquid polymer to a radiation, the apparatus comprising:
a tank (10) for collecting said photo-curing liquid polymer, a bottom of the tank having a hole (11) covered by a sheet (12);
said sheet (12) being made with a material transparent to said radiation;
a supporting plate configured to move away from the sheet (12); and
a membrane (13) arranged on a side of said sheet (12) facing towards said photo-curing liquid polymer, said membrane being transparent to said radiation, and covered by a layer (14) of liquid lubricant that is released gradually by said membrane (13), wherein said liquid lubricant is silicone oil.

10. The apparatus of claim 9, wherein said membrane (13) is made with a self-lubricating polymer.

11. The apparatus of claim 10, wherein said self-lubricating polymer contains said liquid lubricant that is gradually released by said membrane (13).

12. The apparatus of claim 11, wherein said liquid lubricant is insoluble in said self-lubricating polymer.

13. The apparatus of claim 11, wherein said self-lubricating polymer includes a silicone polymer.

14. The apparatus of claim 9, wherein the silicone oil has a viscosity of between 50 and 1000 mm$^2$/s, defined according to the centistoke model cSt at 23° C.

15. The apparatus of claim 9, inside wherein the membrane (13) also contains polytetrafluoroethylene (PTFE).

* * * * *